United States Patent
Igarashi et al.

(10) Patent No.: US 8,522,530 B2
(45) Date of Patent: Sep. 3, 2013

(54) REDUCING AGENT INJECTION VALVE ABNORMALITY DETECTION DEVICE AND ABNORMALITY DETECTION METHOD

(75) Inventors: Hiroyuki Igarashi, Saitama (JP); Eiji Nakao, Saitama (JP)

(73) Assignee: Bosch Corporation, Tokyo (JP)

( * ) Notice: Subject to any disclaimer, the term of this patent is extended or adjusted under 35 U.S.C. 154(b) by 471 days.

(21) Appl. No.: 12/926,065

(22) Filed: Oct. 25, 2010

(65) Prior Publication Data

US 2011/0107742 A1 May 12, 2011

(30) Foreign Application Priority Data

Nov. 6, 2009 (JP) ................................ 2009-254814

(51) Int. Cl.
*F01N 3/00* (2006.01)

(52) U.S. Cl.
USPC .............................................. 60/277; 60/303

(58) Field of Classification Search
USPC ........................................................ 60/277
See application file for complete search history.

(56) References Cited

U.S. PATENT DOCUMENTS

| | | | |
|---|---|---|---|
| 7,617,672 B2 | 11/2009 | Nishina et al. | |
| 7,743,603 B2 * | 6/2010 | Nishina et al. | 60/286 |
| 8,276,437 B2 | 10/2012 | Kitazawa | |
| 2004/0093856 A1 * | 5/2004 | Dingle et al. | 60/286 |
| 2007/0035832 A1 * | 2/2007 | Hirata et al. | 359/484 |
| 2007/0163232 A1 * | 7/2007 | Ueno | 60/274 |
| 2007/0240405 A1 * | 10/2007 | Nishina et al. | 60/286 |
| 2007/0295003 A1 * | 12/2007 | Dingle et al. | 60/301 |
| 2008/0276601 A1 | 11/2008 | Katou et al. | |
| 2008/0282681 A1 | 11/2008 | Katou et al. | |
| 2010/0005871 A1 * | 1/2010 | Kitazawa | 73/114.69 |
| 2010/0071349 A1 * | 3/2010 | Kitazawa | 60/277 |

FOREIGN PATENT DOCUMENTS

| | | |
|---|---|---|
| JP | 2002242663 | 8/2002 |
| JP | 2008180193 A | 8/2008 |
| JP | 2008202469 A | 9/2008 |

\* cited by examiner

*Primary Examiner* — Kenneth Bomberg
*Assistant Examiner* — Jason Shanske
(74) *Attorney, Agent, or Firm* — Michael Best & Friedrich LLP

(57) ABSTRACT

A reducing agent injection valve abnormality detection device for detecting clogging of a reducing agent injection valve in a reducing agent injection device has a pressure detection component that detects the pressure inside a supply path based on a sensor value of a pressure sensor, a pump control component that fixes the output of a pump in a state where the pressure inside the supply path has become a value in a predetermined range, a reducing agent injection valve control component that opens the valve for a predetermined amount of time in a state where the output of the pump has been fixed, and a clogging determination component that determines the extent of clogging of the reducing agent injection valve by comparing, with plural threshold values, the pressure, or a pressure drop quantity, inside the supply path when the valve has been opened for the predetermined amount of time.

5 Claims, 9 Drawing Sheets

REDUCING AGENT INJECTION VALVE ABNORMALITY DETECTION DEVICE AND ABNORMALITY DETECTION METHOD

BACKGROUND

1. Technical Field

The present invention relates to an abnormality detection device and an abnormality detection method for detecting abnormality of a reducing agent injection valve.

The present invention particularly relates to an abnormality detection device and an abnormality detection method for detecting predetermined clogging phenomena occurring in a reducing agent injection valve that injects a reducing agent for purifying nitrogen oxides in exhaust gas into the inside of an exhaust pipe.

2. Related Art

Conventionally, nitrogen oxides ($NO_x$) are included in exhaust gas exhausted from internal combustion engines of automobiles and the like. As one exhaust gas purification system that reduces and purifies the $NO_x$, there is an exhaust gas purification system configured such that a $NO_x$ purification catalyst is disposed in an exhaust pipe of an internal combustion engine and a reducing agent such as an aqueous solution of urea or unburned fuel is injected on the upstream side of the $NO_x$ purification catalyst.

This exhaust gas purification system is configured to promote, in the $NO_x$ purification catalyst, a reduction reaction between the reducing agent and the $NO_x$ in the exhaust gas to thereby break down the $NO_x$ into nitrogen, water, and carbon dioxide and release the nitrogen, water, and carbon dioxide into the atmosphere.

As one aspect of a reducing agent injection device with which this exhaust gas purification system is equipped, there is an injection-type reducing agent injection device that supplies the reducing agent directly to the inside of the exhaust pipe via a reducing agent injection valve.

Here, when an aqueous solution of urea is used as the reducing agent, the aqueous solution of urea has the property that it freezes and crystallizes in a predetermined temperature range, and it is easy for the aqueous solution of urea to cause clogging of the reducing agent injection valve.

Further, sometimes, regardless of the type of reducing agent, clogging of the reducing agent injection valve occurs as a result of particulate matter of soot or the like or unburned fuel included in the exhaust gas entering the inside of the reducing agent injection valve and carbonizing. When clogging occurs in the reducing agent injection valve, it becomes difficult to inject a target quantity of the reducing agent into the inside of the exhaust pipe, the quantity of the reducing agent that should be supplied to the $NO_x$ purification catalyst becomes insufficient, and exhaust gas purification efficiency ends up deteriorating.

Thus, as a method of detecting clogging of the reducing agent injection valve, there has been disclosed a method that uses a pressure drop quantity inside a supply path interconnecting the reducing agent injection valve and a pump to determine whether or not there is clogging (see JP-A-2008-180193).

More specifically, this method determines, in an injection-type injection device, clogging of the reducing agent injection valve by comparing a pressure drop quantity at a time when the valve is open, which represents a pressure drop quantity inside the supply path whose pressure has dropped in a predetermined amount of time when pressure-feeding by the pump has been stopped in a state where the reducing agent injection valve is in an injection mode, and a pressure drop quantity at a time when the valve is closed, which represents a pressure drop quantity inside the supply path whose pressure has dropped in a predetermined amount of time when pressure-feeding by the pump has been stopped in a state where the reducing agent injection valve is in a completely closed mode.

This determination method is configured to determine that there is clogging in the reducing agent injection valve when the difference between the pressure drop quantity at the time when the valve is open and the pressure drop quantity at the time when the valve is closed has become equal to or less than a predetermined value.

Further, as a method that uses a pressure drop quantity inside the supply path to determine whether or not there is clogging, there has also been disclosed the method described below (see JP-A-2008-202469).

More specifically, for example, this reducing agent path clogging determination method includes the steps of: controlling the drive duty of the pump such that a value detected by a pressure sensor disposed in a first reducing agent path (a path disposed between the pump and the reducing agent injection valve) is maintained at a predetermined value to thereby discriminate whether or not the drive duty of the pump is less than a predetermined threshold value; stopping the pump and completely opening the reducing agent injection valve when it has been discriminated that the drive duty of the pump is less than the predetermined threshold value to thereby calculate a pressure drop quantity where the pressure value inside the first reducing agent path detected by the pressure sensor drops in a predetermined amount of time; and discriminating whether or not clogging is occurring in the first reducing agent path or a second reducing agent path (a path that is connected to the reducing agent injection valve and is for allowing the reducing agent to circulate) on the basis of the pressure drop quantity that has been calculated.

Incidentally, there are cases where clogging in which all or most of the injection hole in the reducing agent injection valve is blocked (hereinafter called "complete clogging") occurs and cases where clogging that is not complete clogging but in which part of the injection hole is blocked (hereinafter called "partial clogging") occurs.

In partial clogging, the extent of clogging differs depending on the degree of blockage of the injection hole. Additionally, when the extent of clogging differs, a difference will arise in the quantity of reducing agent that is injected from the reducing agent injection valve in a predetermined open valve time period.

Here, the clogging determination methods described in JP-A-2008-180193 and JP-A-2008-202469 are configured to compare a pressure drop quantity with a predetermined threshold value.

That is, the clogging determination methods of JP-A-2008-180193 and JP-A-2008-202469 can obtain a rough determination effect of determining whether or not clogging is occurring, but they cannot obtain a fine determination effect of determining the extent to which clogging is occurring.

Consequently, when the extent of clogging cannot be accurately determined, it becomes difficult to accurately perform correction of the injection quantity of the reducing agent due to clogging, and, as a result, the deterioration in exhaust gas purification efficiency until clogging is eliminated becomes unable to be kept to a minimum.

Further, when the extent of clogging cannot be determined, it becomes difficult to judge what action should be taken thereafter in response to the extent of clogging, such as whether the reducing agent injection valve should be replaced or whether the clogging can be addressed with injection quantity correction.

Thus, the inventors of the present invention made every effort to discover that this problem can be solved by disposing plural threshold values for performing determination of clogging of the reducing agent injection valve and comparing these threshold values with the pressure inside the reducing agent supply path, and thus the inventors completed the present invention.

That is, it is an object of the present invention to provide a reducing agent injection valve abnormality detection device and abnormality detection method that can detect the extent of clogging of a reducing agent injection valve.

SUMMARY

According to the present invention, there is provided a reducing agent injection valve abnormality detection device for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, clogging of the reducing agent injection valve, the reducing agent injection valve abnormality detection device including:

a pressure detection component that detects the pressure inside the supply path on the basis of a sensor value of the pressure sensor;

a pump control component that fixes the output of the pump in a state where the pressure inside the supply path has become a value in a predetermined range;

a reducing agent injection valve control component that opens the reducing agent injection valve for a predetermined amount of time in a state where the output of the pump has been fixed; and a clogging determination component that determines the extent of clogging of the reducing agent injection valve by comparing, with plural threshold values, the pressure, or a pressure drop quantity, inside the supply path when the reducing agent injection valve has been opened for the predetermined amount of time, and thus the problem described above can be solved.

Further, in configuring the reducing agent injection valve abnormality detection device of the present invention, it is preferred that the clogging determination component uses a first-order threshold value for determining that the reducing agent injection valve is completely clogged to determine whether clogging is occurring in the reducing agent injection valve and, when it has been determined that the reducing agent injection valve is not completely clogged, uses the plural threshold values to determine the extent of the clogging.

Further, in configuring the reducing agent injection valve abnormality detection device of the present invention, it is preferred that the pump control component performs feedback control of the output of the pump, such that the pressure inside the supply path is maintained at a predetermined target pressure, during execution of reducing agent injection control, and when a change in the output of the pump corresponding to an injection quantity from the reducing agent injection valve is not seen during execution of the reducing agent injection control, the clogging determination component executes determination of the extent of the clogging.

Further, in configuring the reducing agent injection valve abnormality detection device of the present invention, it is preferred that when an aqueous solution of urea is used as the reducing agent, when the outdoor air temperature or the temperature of exhaust gas is less than a predetermined temperature when clogging of the reducing agent injection valve has been detected, the clogging determination component actuates heating means or exhaust gas temperature raising means disposed in the reducing agent injection device and thereafter again determines the extent of the clogging.

Further, in configuring the reducing agent injection valve abnormality detection device of the present invention, it is preferred that when the reducing agent injection valve is a multiple injection hole-type injection valve having plural injection holes, the number of the plural threshold values is the same as the number of the injection holes.

Further, another aspect of the present invention is a reducing agent injection valve abnormality detection method for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, clogging of the reducing agent injection valve, the reducing agent injection valve abnormality detection method including:

fixing the output of the pump and opening the reducing agent injection valve for a predetermined amount of time in a state where the pressure inside the supply path has become a value in a predetermined range;

obtaining the pressure, or a pressure drop quantity, inside the supply path when the reducing agent injection valve has been opened for the predetermined amount of time; and determining the extent of clogging of the reducing agent injection valve by comparing, with plural threshold values, the pressure, or the pressure drop quantity, inside the supply path that has been detected.

According to the reducing agent injection valve abnormality detection device and abnormality detection method of the present invention, the comparison between the plural threshold values and the pressure, or the pressure drop quantity, inside the supply path when the reducing agent injection valve has been opened for the predetermined amount of time in a state where the output of the pump has been fixed is performed, so the extent of clogging can be detected on the basis of the pressure change quantity that differs depending on the extent of clogging.

Consequently, control for correcting the injection quantity of the reducing agent and eliminating clogging can be performed in response to the extent of clogging of the reducing agent injection valve, and whether or not the reducing agent injection valve needs to be replaced can be appropriately judged.

Further, in the reducing agent injection valve abnormality detection device of the present invention, the clogging determination component determines beforehand whether or not complete clogging is occurring in the reducing agent injection valve and thereafter determines the extent of clogging of the reducing agent injection valve when complete clogging is not seen, so that when complete clogging is occurring in the reducing agent injection valve, the clogging determination component can speedily stop reducing agent injection control or prompt replacement of the reducing agent injection valve.

Further, in the reducing agent injection valve abnormality detection device of the present invention, the clogging determination component executes predetermined clogging extent determination only when some kind of abnormality has been seen during execution of the reducing agent injection control, whereby the reducing agent injection valve is not interrupted until an abnormality is seen, so exhaust gas purification control is not longer affected.

Further, in the reducing agent injection valve abnormality detection device of the present invention, when an aqueous solution of urea is used as the reducing agent, when the outdoor air temperature or the temperature of the exhaust gas when clogging of the reducing agent injection valve has been detected is less than the predetermined temperature, the clogging determination component actuates the predetermined heating means or exhaust gas temperature raising means and thereafter again determines the extent of the clogging, whereby the extent of clogging other than clogging caused by freezing or temporary crystallization of the reducing agent can be detected.

Further, in the reducing agent injection valve abnormality detection device of the present invention, by using a number of threshold values equal to the number of the injection holes in the reducing agent injection valve and determining the extent of clogging, the extent of clogging can be determined in light of the number of the injection holes.

DETAILED DESCRIPTION

Figure 1:
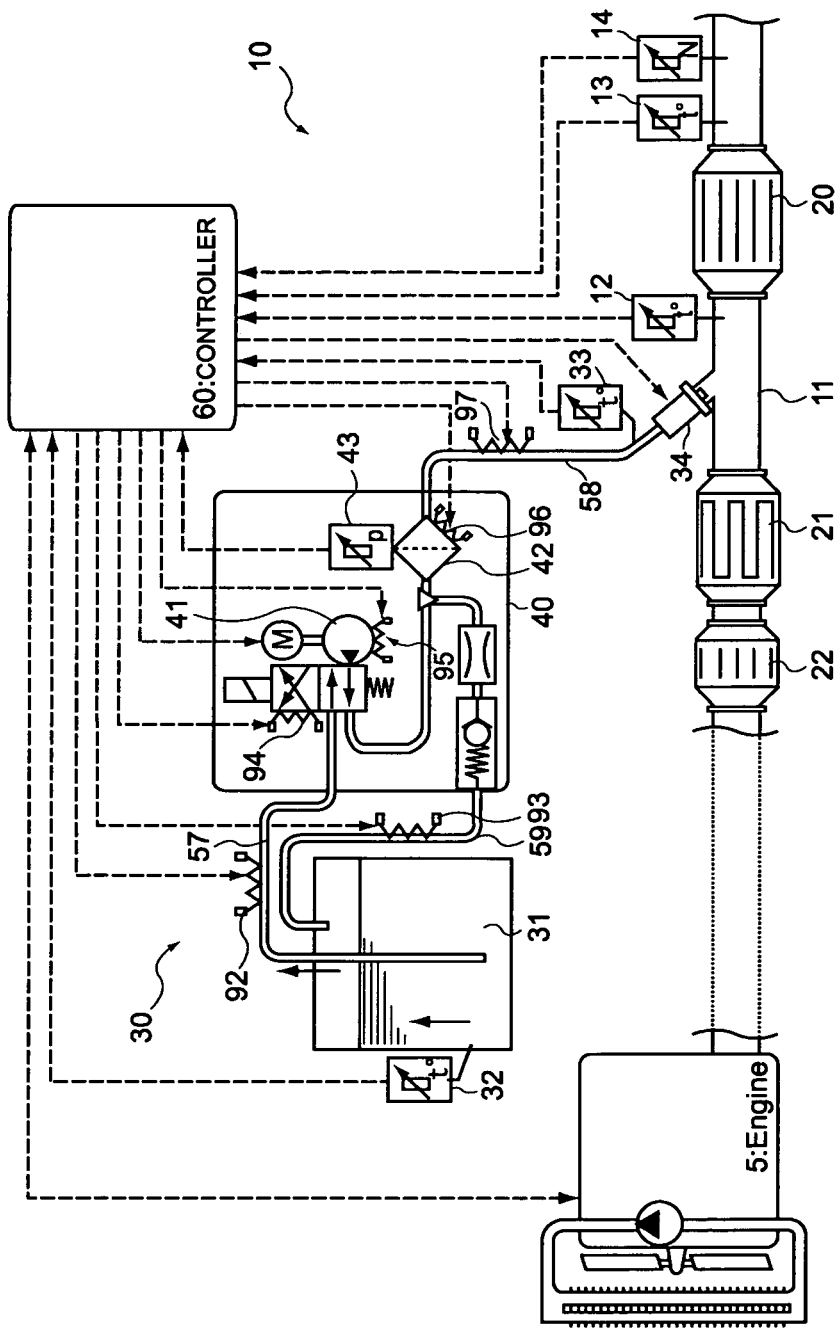
FIG. 1 is a diagram showing an example configuration of an exhaust gas purification system.

Embodiments relating to a reducing agent injection valve abnormality detection device and abnormality detection method of the present invention will be specifically described below with appropriate reference to the drawings.

The embodiments below, however, represent one aspect of the present invention, are not intended to limit the present invention, and can be arbitrarily altered within the scope of the present invention.

The same reference signs denote the same members in the drawings, and description of those same members will be appropriately omitted.

First Embodiment

A first embodiment is a reducing agent injection valve abnormality detection device for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, clogging of the reducing agent injection valve, the reducing agent injection valve abnormality detection device including:

a pressure detection component that detects the pressure inside the supply path on the basis of a sensor value of the pressure sensor;

a pump control component that fixes the output of the pump in a state where the pressure inside the supply path has become a value in a predetermined range;

a reducing agent injection valve control component that opens the reducing agent injection valve for a predetermined amount of time in a state where the output of the pump has been fixed; and a clogging determination component that determines the extent of clogging of the reducing agent injection valve by comparing, with plural threshold values, the pressure, or a pressure drop quantity, inside the supply path when the reducing agent injection valve has been opened for the predetermined amount of time.

The embodiment will be divided into its constituent features and specifically described below.

1. Exhaust Gas Purification System

FIG. 1 shows an example configuration of an exhaust gas purification system 10 equipped with a reducing agent injection device 30. This exhaust gas purification system 10 is equipped with a reduction catalyst 20, a particulate filter 21, an oxidation catalyst 22, the reducing agent injection device 30, a controller 60 and the like.

This exhaust gas purification system 10 is configured as a urea selective catalytic reduction system that uses an aqueous solution of urea as a reducing agent to purify $NO_x$ in exhaust gas exhausted from an internal combustion engine 5 installed in a vehicle. The reducing agent in the present invention is, however, not limited to an aqueous solution of urea.

Further, the reduction catalyst 20 is disposed in an exhaust pipe 11, adsorbs ammonia generated as a result of the aqueous solution of urea injected inside the exhaust pipe 11 on the upstream side hydrolyzing, promotes a reduction reaction between the ammonia and the $NO_x$ and breaks down the $NO_x$ into nitrogen, water, carbon dioxide, and the like. A publicly known catalyst is appropriately used as the reduction catalyst 20.

Further, an upstream-side temperature sensor 12 is disposed on the upstream side of the reduction catalyst 20, and a downstream-side temperature sensor 13 and a $NO_x$ sensor 14 are disposed on the downstream side of the reduction catalyst 20.

Sensor information detected by these sensors is transmitted to the controller 60, and an exhaust gas temperature Tgas, a reduction catalyst temperature Tcat, a $NO_x$ concentration Nnox in the exhaust gas and the like on the downstream side of the reduction catalyst 20 are obtained.

Further, the particulate filter 21 is disposed on the upstream side of the reduction catalyst 20 and traps particulate matter in the exhaust gas. Further, the oxidation catalyst 22 is disposed on the upstream side of the particulate filter 21 and is mainly used in regeneration control of the particulate filter 21.

Specifically, the oxidation catalyst 22 oxidizes unburned fuel supplied to the inside of the exhaust pipe 11 by post-injection of the internal combustion engine 5 and raises the exhaust gas temperature Tgas to thereby forcibly burn the particulate matter trapped in the particulate filter 21 and regenerate the particulate filter 21. Publicly known members are appropriately used as the particulate filter 21 and the oxidation catalyst 22.

Further, the exhaust gas temperature raising means that raises the exhaust gas temperature Tgas is not limited to means that executes post-injection; for example, a device that injects and supplies fuel to the upstream side of the oxidation catalyst 22 can also be used.

A heater, a burner device or the like may also be disposed on the upstream side of the particulate filter 21, and the heater or the burner device may be actuated to raise the exhaust gas temperature Tgas.

2. Reducing Agent Injection Device

The reducing agent injection device 30 has as its main elements and is configured by a storage tank 31, a reducing agent injection valve 34, a pump module 40 that is equipped with a pump 41, and the like.

Here, the storage tank 31 and the pump 41 are interconnected by a first supply path 57, and the pump 41 and the reducing agent injection valve 34 are interconnected by a second supply path 58. Further, a circulation path 59 leading to the storage tank 31 is connected to the middle of the second supply path 58. Additionally, as for the reducing agent injection device 30 itself, a reducing agent injection device with a publicly known configuration can be used.

Further, an aqueous solution of urea adjusted to a concentration (e.g., 32.5% by weight) that takes into consideration $NO_x$ purification efficiency, cold resistance and the like is housed in the storage tank 31.

The freezing temperature of the aqueous solution of urea adjusted to this concentration is about −11° C. In order to prevent local or overall freezing of the aqueous solution of urea in cold weather, heaters 92 to 97 are disposed in the storage tank 31, the pump module 40, the second supply path 58, etc. Instead of the heaters 92 to 97, the exhaust gas purification system 10 can also be given a configuration that circulates engine cooling water or the like and heats the reducing agent injection device 30.

This aqueous solution of urea has the property that it easily freezes in cold weather and also has the property that it easily crystallizes as a result of the water that is the solvent of the aqueous solution of urea evaporating when the temperature of the aqueous solution of urea is in a temperature state in a predetermined range (about 80° C. to about 120° C.).

Further, temporary crystallization of the aqueous solution of urea can be dissolved by heating the aqueous solution of urea to a predetermined temperature (about 120° C.) or higher, but crystal that has denatured over time has the property that it is resistant to heat and difficult to dissolve.

Further, the reducing agent injection valve 34 is fixed to the exhaust pipe 11 on the upstream side of the reduction catalyst 20 and on the downstream side of the particulate filter 21 and injects the aqueous solution of urea into the inside of the exhaust pipe 11.

An electromagnetically driven ON-OFF valve that is controlled so as to completely open or completely close by energization, for example, is used as the reducing agent injection valve 34.

In the present embodiment, a multiple injection hole-type reducing agent injection valve having three injection holes is used as the reducing agent injection valve 34. Further, each of the injection holes in the multiple injection hole-type reducing agent injection valve 34 is formed such that its diameter is small as compared to the diameter of the injection hole in a single injection hole-type reducing agent injection valve that has only one injection hole, for example. The reducing agent injection valve 34 may also, however, be a single injection hole-type reducing agent injection valve.

Further, the pump module 40 is configured to include the pump 41, a filter 42, and a pressure sensor 43.

A motor-driven pump that is driven and controlled by the controller 60, for example, is used as the pump 41. Additionally, the pump 41 of the present embodiment is configured such that its output is feedback-controlled such that the pressure inside the second supply path 58 detected by the pressure sensor 43 is maintained at a predetermined value.

Further, the filter 42 and the pressure sensor 43 are placed in the second supply path 58.

Additionally, foreign matter in the aqueous solution of urea is trapped by the filter 42.

Further, a pressure Pv inside the second supply path 58 is detected on the basis of the sensor value outputted from the pressure sensor 43. The detected pressure Pv inside the second supply path 58 is used in control of the output of the pump 41 and in determination of clogging of the reducing agent injection valve 34.

3. Controller (Abnormality Detection Device)

Further, the controller 60 not only has a function as a device that controls the reducing agent injection device 30 but also has a function as a device that detects abnormality of the reducing agent injection valve 34.

Figure 2:
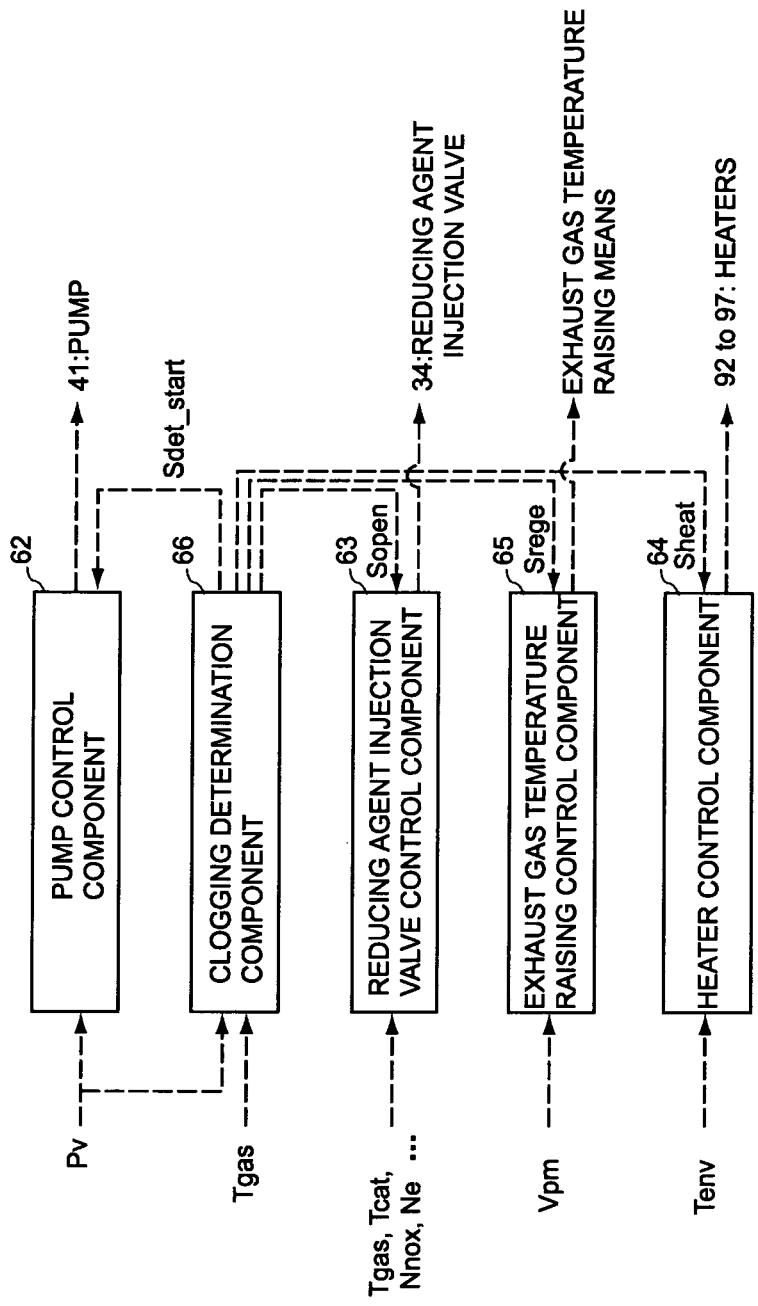
FIG. 2 is a block diagram showing an example configuration of a reducing agent injection valve abnormality detection device pertaining to a first embodiment of the present invention.

FIG. 2 shows an example configuration where portions of the controller 60 of the present embodiment that are associated with detecting abnormality of the reducing agent injection valve 34 are represented by functional blocks.

That is, the controller 60 of the present embodiment has as its main elements and is configured by a pump control component 62, a reducing agent injection valve control component 63, a heater control component 64, an exhaust gas temperature raising control component 65, a clogging determination component 66 and the like. Each component is realized by the execution of a program by a microcomputer (not shown).

This controller 60 is configured such that it can read not only sensor information detected by the pressure sensor 43 disposed in the second supply path 58, the upstream-side temperature sensor 12 and the downstream-side temperature sensor 13 disposed in the exhaust pipe 11, and an outdoor air temperature sensor but also information relating to the operating state of the internal combustion engine 5 such as the fuel injection quantity, the injection timing, and a speed Ne of the internal combustion engine 5.

Further, the controller 60 is equipped with an unillustrated random access memory (RAM), and the various types of information read by the control unit 60 and calculation results of each component are stored in the RAM. Three different threshold values Pdet_thr1 to Pdet_thr3 that are used in order to implement detection of abnormality of the reducing agent injection valve 34 are stored beforehand in this RAM.

Further, the pump control component 62 continuously reads the pressure Pv inside the second supply path 58 detected by the pressure sensor 43 and performs feedback control of the output of the pump 41 such that this pressure Pv is maintained at a predetermined target pressure Pv_tgt.

Further, when the pump control component 62 has received a diagnosis start signal Sdet_start from the clogging determination component 66, the pump control component 62 performs control that fixes the output of the pump 41.

Further, the reducing agent injection valve control component 63 calculates a target injection quantity Qurea of the reducing agent on the basis of the exhaust gas temperature Tgas, the reduction catalyst temperature Tcat, the $NO_x$ concentration Nnox on the downstream side of the reduction catalyst 20, and information relating to the operating state of the internal combustion engine 5, and performs drive control of the reducing agent injection valve 34 such that the target injection quantity Qurea is achieved.

Further, when the reducing agent injection valve control component 63 has received an open valve signal Sopen from the clogging determination component 66, the reducing agent injection valve control component 63 performs energization control such that a valve opening operation of the reducing agent injection valve 34 for a predetermined amount of time decided beforehand is performed. It suffices for this predetermined amount of time to be an amount of time in which a change in the pressure inside the second supply path 58 appears prominently because of the injection of the reducing agent accompanying valve opening, and the predetermined amount of time is not particularly limited.

Further, the heater control component 64 performs energization control with respect to the heaters 92 to 97 to perform control that heats the reducing agent injection device 30 and the aqueous solution of urea.

In the controller 60 of the present embodiment, energization of the heaters 92 to 97 is performed when it is judged, on the basis of an outdoor air temperature Tenv detected by the outdoor air temperature sensor, that there is the potential for the aqueous solution of urea to freeze. Further, the heater control component 64 performs energization control with respect to the heaters 92 to 97 also when it has received a heater actuation signal Sheat from the clogging determination component 66.

Further, the exhaust gas temperature raising control component 65 performs control that raises the exhaust gas temperature Tgas when a sediment quantity Vpm of the particulate matter that has been deposited in the particulate filter 21 has exceeded a predetermined threshold value.

Additionally, the exhaust gas temperature raising control component 65 performs control that raises the exhaust gas temperature Tgas also when it has received a raise exhaust gas temperature execution signal Srege from the clogging determination component 66.

In the present embodiment, the exhaust gas temperature raising control component 65 is configured to output a post-injection execution signal to a fuel injection valve control component of the internal combustion engine 5 to thereby raise the exhaust gas temperature Tgas.

Further, the clogging determination component 66 outputs the diagnosis start signal Sdet_start to the pump control component 62 to cause the pump control component 62 to fix the output of the pump 41 when the pressure inside the second supply path 58 detected by the pressure sensor 43 is in a predetermined range.

At the same time as or slightly later than this, the clogging determination component 66 outputs the open valve signal Sopen to the reducing agent injection valve control component 63 to cause the reducing agent injection control component 63 to execute the energization control such that the valve opening operation of the reducing agent injection valve 34 for the predetermined amount of time is performed.

Additionally, the clogging determination component 66 compares a pressure Pdet inside the second supply path 58 when the valve opening operation of the reducing agent injection valve 34 has been performed with the plural threshold values Pdet_thr1 to Pdet_thr3 stored in the RAM to determine the extent of clogging of the reducing agent injection valve 34.

In the controller 60 of the present embodiment, a condition where the exhaust gas temperature Tgas is equal to or greater than the predetermined temperature is, besides a condition where the pressure Pv inside the second supply path 58 is in the predetermined range, used as the condition for the start of diagnosis, but besides these, various conditions may also be set, such as a condition where a temperature Turea of the aqueous solution of urea is equal to or greater than a predetermined temperature. When the exhaust gas temperature Tgas is less than the predetermined temperature, the clogging determination component 66 outputs the raise exhaust gas temperature execution signal Srege to the exhaust gas temperature raising control unit 65.

Further, a method of determining the extent of clogging of the reducing agent injection valve 34 that is executed by the clogging determination component 66 will be specifically described.

That is, the clogging determination component 66 discriminates which region of four regions A1 to A4 divided by the three threshold values Pdet_thr1 to Pdet_thr3 that the pressure Pdet, which is detected after energization control has been implemented such that the valve opening operation of the reducing agent injection valve 34 for the predetermined amount of time is performed, belongs to.

Further, when the pressure Pdet belongs to the region A4 where the pressure Pdet exceeds the threshold value Pdet_thr1, the clogging determination component 66 determines that the reducing agent injection valve 34 is in a completely clogged state where the reducing agent injection valve 34 is completely clogged.

Further, when the pressure Pdet belongs to the region A3 where the pressure Pdet exceeds the threshold value Pdet_thr2 and is equal to or less than the threshold value Pdet_thr1, the clogging determination component 66 determines that the reducing agent injection valve 34 is not in the completely clogged state but is in a heavily clogged state. When the pressure Pdet belongs to the region A2 where the pressure Pdet exceeds the threshold value Pdet_thr3 and is equal to or less than the threshold value Pdet_thr2, the clogging determination component 66 determines that the reducing agent injection valve 34 is in a lightly clogged state.

Further, when the pressure Pdet belongs to the region A1 where the pressure Pdet is equal to or less than the threshold value Pdet_thr3, the clogging determination component 66 determines that the reducing agent injection valve 34 is in a clog-free state where clogging is not occurring at all in the reducing agent injection valve 34.

As described above, the multiple injection hole-type reducing agent injection valve 34 is used in the reducing agent injection device 30 of the present embodiment, and the threshold values Pdet_thr1 to Pdet_thr3 are set to match the number of injection holes.

That is, each of the threshold values Pdet_thr1 to Pdet_thr3 is set beforehand such that a state that is equivalent to all of the three injection holes in the reducing agent injection valve 34 being clogged is detected as the completely clogged state, a state that is equivalent to two of the three injection holes being clogged is detected as the heavily clogged state, and a state that is equivalent to one of the three injection holes being clogged is detected as the lightly clogged state. By further increasing the number of threshold values, it becomes possible to more finely determine the extent of clogging.

Further, in the controller 60 of the present embodiment, when it has been determined that some kind of clogging is occurring in the reducing agent injection valve 34, the clogging determination component 66 transmits the heater actuation signal Sheat to the heater control component 94 or transmits the raise exhaust gas temperature execution signal Srege to the exhaust gas temperature raising control component 95 to thereby cause the heat control component 94 to actuate the heaters 92 to 97 or cause the exhaust gas temperature raising control component 95 to raise the exhaust gas temperature Tgas. Thus, the controller 60 is configured such that, when clogging of the reducing agent injection valve 34 is occurring because of freezing or temporary crystallization of the reducing agent, the control unit 60 executes control that eliminates this clogging and detects clogging due to a reason other than freezing or temporary crystallization of the reducing agent.

In the example of the method of determining the extent of clogging described above, the controller 60 compares, with the plural threshold values Pdet_thr1 to Pdet_thr3, the pressure detected after the valve opening operation of the reducing agent injection valve 34 has been performed, but the controller 60 can perform the same abnormality detection even when it is configured to compare, with the plural threshold values, a pressure drop quantity or a pressure drop percentage inside the second supply path 58 in a predetermined amount of time after the valve opening operation of the reducing agent injection valve 34 has been performed. Moreover, the threshold values may also be a pattern having a predetermined gradient rather than being predetermined values. In this case, the controller 60 may also be configured to continuously monitor the pressure inside the second supply path 58 in the predetermined amount of time after the valve opening operation of the reducing agent injection valve 34 has been performed and to compare the change in the pressure inside the second supply path 58 with the plural threshold values.

4. Reducing Agent Injection Valve Abnormality Detection Method

Figure 3:
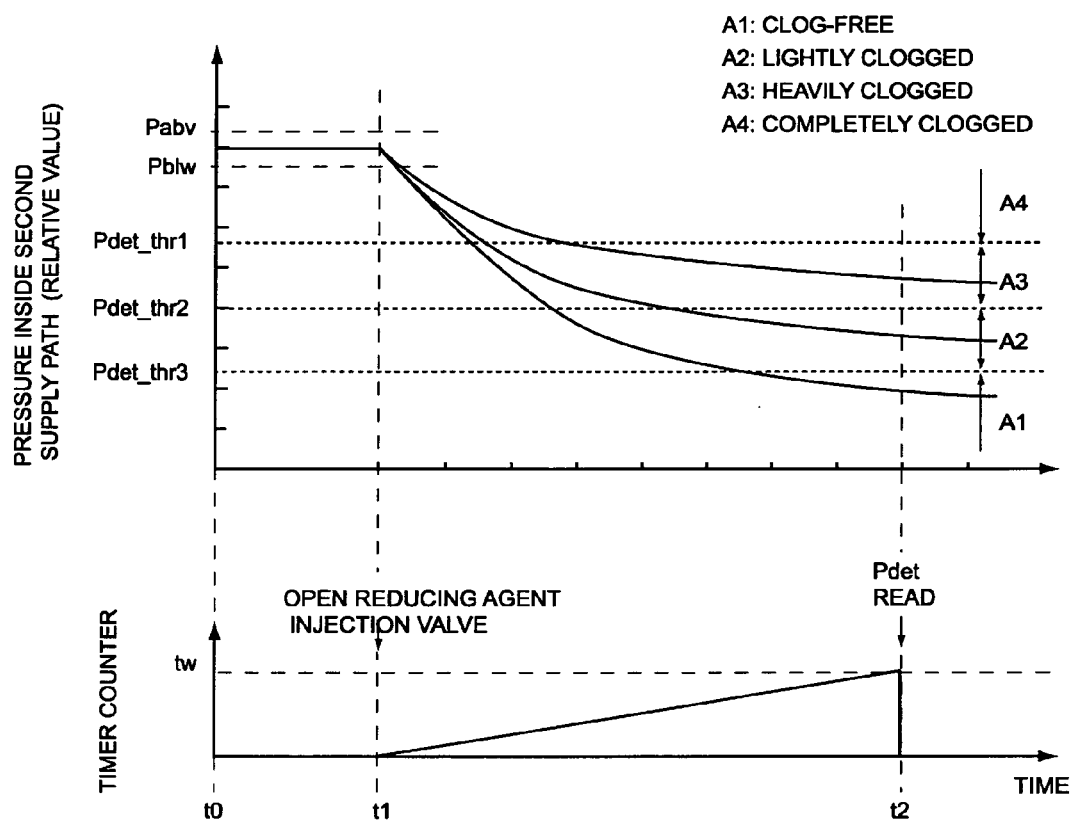
FIG. 3 is a timing chart for describing a reducing agent injection valve abnormality detection method pertaining to the first embodiment of the present invention.
Figure 4:
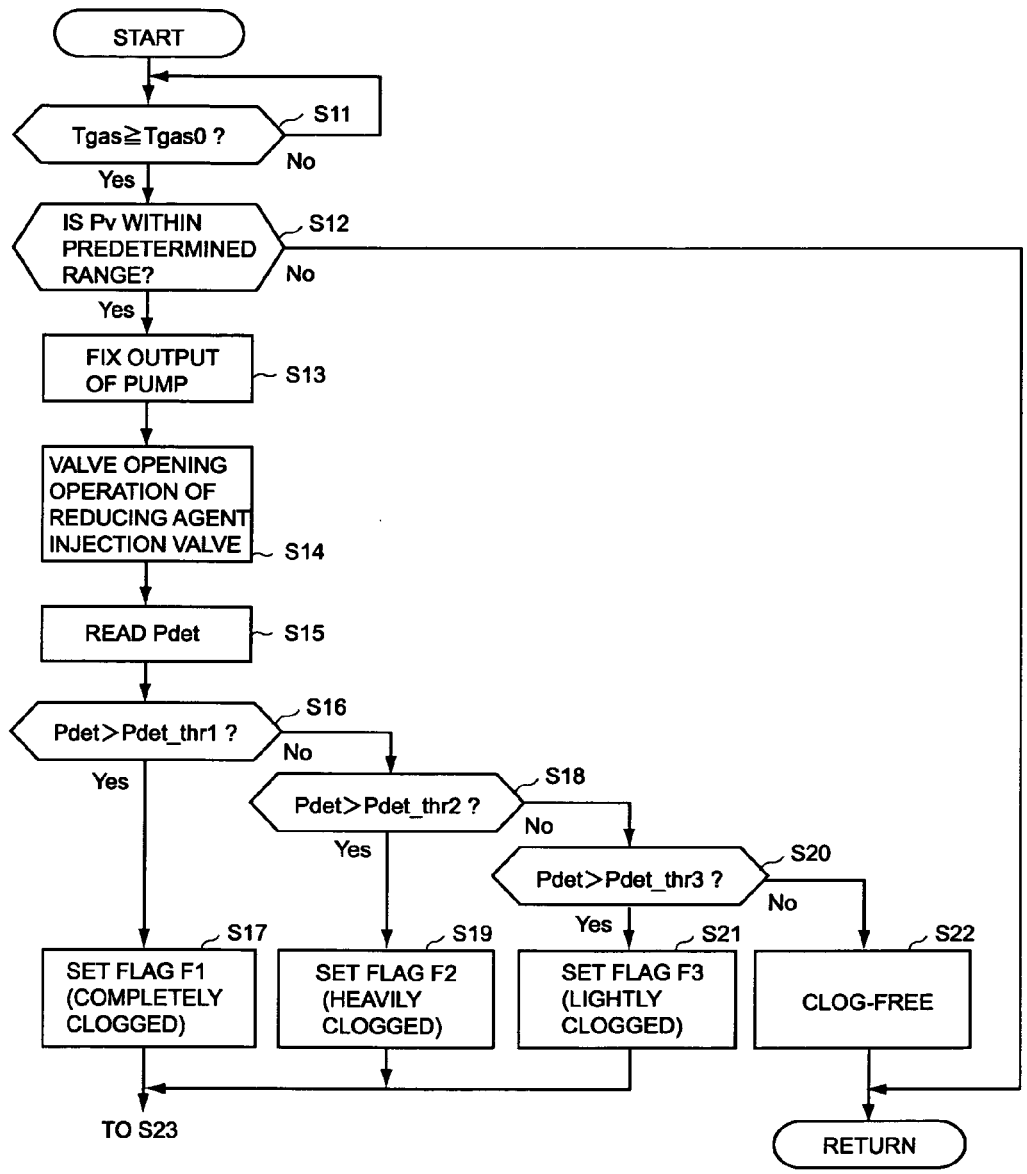
FIG. 4 is a flowchart for describing the reducing agent injection valve abnormality detection method (third-order determination control pertaining to a second embodiment) pertaining to the first embodiment of the present invention.
Figure 5:
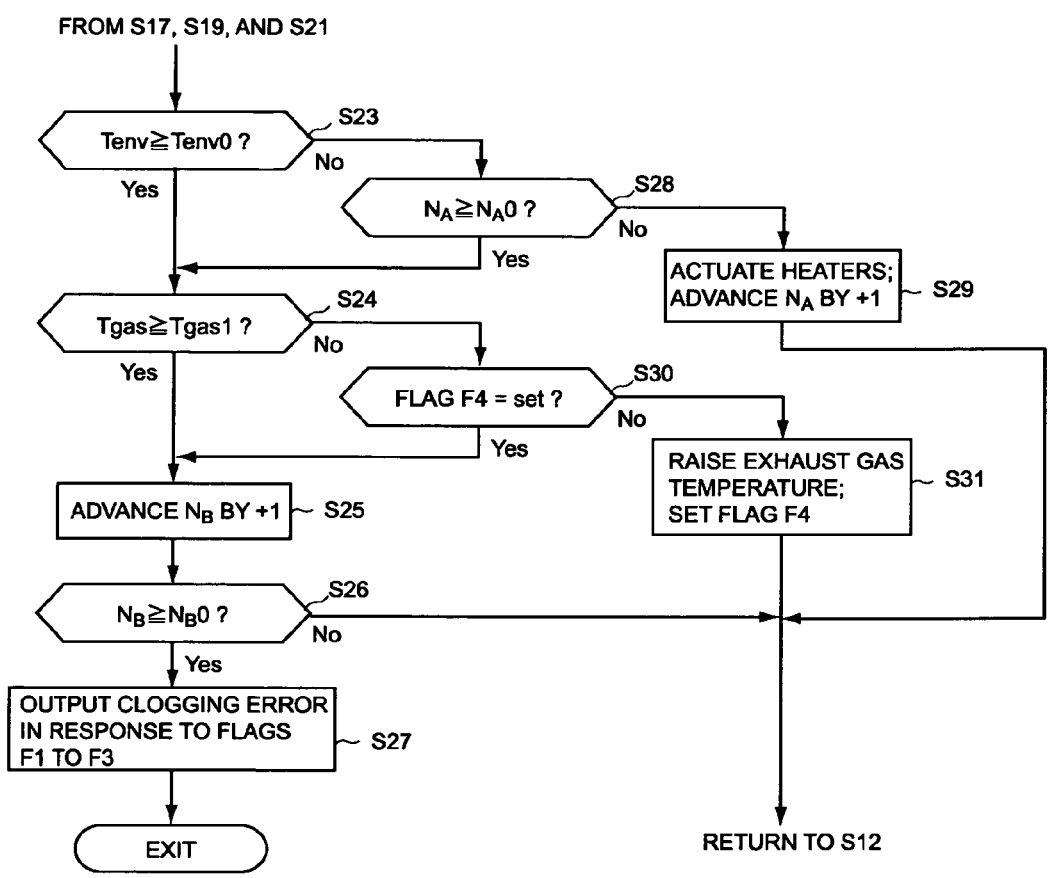
FIG. 5 is a flowchart for describing the reducing agent injection valve abnormality detection method (third-order determination control pertaining to the second embodiment) pertaining to the first embodiment of the present invention.

Next, a method of determining the extent of clogging of the reducing agent injection valve 34 that is performed by the controller (abnormality detection device) 60 of the present embodiment will be specifically described on the basis of the timing chart shown in FIG. 3 and the control flow shown in FIG. 4 and FIG. 5. FIG. 3 shows the change in the pressure inside the second supply path 58 with time and the transition of a timer value.

In this control flow example, first, in step S11 after the start, it is discriminated whether or not the exhaust gas temperature Tgas is equal to or greater than a predetermined temperature Tgas0 in a state where the pump 41 is being driven. The controller 60 may also be configured to estimate the exhaust gas temperature Tgas from the catalyst temperature Tcat or the like rather than looking at the exhaust gas temperature Tgas directly. Step S11 is repeated until the exhaust gas temperature Tgas becomes equal to or greater than the predetermined temperature Tgas0. When the exhaust gas temperature Tgas becomes equal to or greater than Tgas0, the controller 60 advances to step S12.

In step S12, it is discriminated whether or not the pressure Pv inside the second supply path 58 is showing a value in a predetermined range (time period t0 to t1 in FIG. 3). Unless the pressure Pv is in the predetermined range, accurate clogging determination cannot be performed, so the controller 60 ends the present routine. If the pressure Pv is in the predetermined range, the controller 60 advances to step S13 where it fixes the output of the pump 41.

Next, in step S14, the controller 60 executes energization control such that the valve opening operation for the predetermined amount of time resulting from the reducing agent injection valve 34 is performed. Thereafter, in step S15, the controller 60 reads the pressure Pdet inside the second supply path 58. Next, in step S16, it is discriminated whether or not the pressure Pdet that was read in step S15 exceeds the threshold value Pdet_thr1 (point-in-time t2 in FIG. 3). When the pressure Pdet exceeds the threshold value Pdet_thr1, the pressure Pdet belongs to the region A4, so the controller 60 advances to step S17 where it sets a flag F1 indicating that the reducing agent injection valve 34 is in the completely clogged state. Then, the controller 60 advances to step S23. On the other hand, when the pressure Pdet is equal to or less than the threshold value Pdet_thr1, the controller 60 advances to step S18.

In step S18, it is discriminated whether or not the pressure Pdet exceeds the threshold value Pdet_thr2. When the pressure Pdet exceeds the threshold value Pdet_thr2, the pressure Pdet belongs to the region A3 where the pressure Pdet exceeds the threshold value Pdet_thr2 and is equal to or less than the threshold value Pdet_thr1. In this case, the controller 60 advances to step S19 where it sets a flag F2 indicating that the reducing agent injection valve 34 is in the heavily clogged state. Then, the controller 60 advances to step S23. On the other hand, when the pressure Pdet is equal to or less than the threshold value Pdet_thr2, the controller 60 advances to step S20.

In step S20, it is discriminated whether or not the pressure Pdet exceeds the threshold value Pdet_thr3. When the pressure Pdet exceeds the threshold value Pdet_thr3, the pressure Pdet belongs to the region A2 where the pressure Pdet exceeds the threshold value Pdet_thr3 and is equal to or less than the threshold value Pdet_thr2. In this case, the controller 60 advances to step S21 where it sets a flag F3 indicating that the reducing agent injection valve 34 is in the lightly clogged state. Then, the controller 60 advances to step S23. On the other hand, when the pressure Pdet is equal to or less than the threshold value Pdet_thr3 and belongs to the region A1, the controller 60 advances to step S22. In step S22, to which the controller 60 advances when the pressure Pdet is equal to or less than the threshold value Pdet_thr3, it is determined that clogging is not occurring in the reducing agent injection valve 34, and the controller 60 ends the present routine.

In step S23, to which the controller 60 advances after setting the flags indicating the occurrence of some kind of clogging in step S17, step S19, and step S21, it is discriminated whether or not the outdoor air temperature Tenv is equal to or greater than a predetermined threshold value Tenv0. This step is a step for verifying the potential that clogging of the reducing agent injection valve 34 is occurring because of freezing of the reducing agent. When the outdoor air temperature Tenv is equal to or greater than the predetermined threshold value Tenv0, the controller 60 advances to step S24. On the other hand, when the outdoor air temperature Tenv is less than the predetermined threshold value Tenv0, the controller 60 advances to step S28 where it is discriminated whether or not a value $N_A$ of a counter that counts the number of times the heaters are actuated is equal to or greater than a predetermined threshold value $N_A0$.

When the counter value $N_A$ is less than the threshold value $N_A0$, the controller 60 advances to step S29 where it energizes the heaters 92 to 97, heats the reducing agent injection device 30, and advances the counter value $N_A$ by 1. Thereafter, the controller 60 returns to step S12. On the other hand, when the counter value $N_A$ is equal to or greater than the threshold value $N_A0$, the reducing agent injection device 30 is sufficiently heated, and it can be considered that clogging of the reducing agent injection valve 34 is not due to freezing of the reducing agent, so the controller 60 advances to step S24.

In step S24, it is discriminated whether or not the exhaust gas temperature Tgas is equal to or greater than a predetermined threshold value Tgas1. The controller 60 may also be configured to estimate the exhaust gas temperature Tgas from the catalyst temperature Tcat or the like rather than looking at the exhaust gas temperature Tgas directly. When the exhaust gas temperature Tgas is equal to or greater than the threshold value Tgas1, the controller 60 advances to the next step S25. On the other hand, when the exhaust gas temperature Tgas is less than the threshold value Tgas1, the controller 60 advances to step S30, and it is discriminated whether or not a flag F4 indicating execution and recording of control to raise the exhaust gas temperature Tgas has been set.

When the flag F4 has not been set, the controller 60 advances to step S31 where it executes control to raise the exhaust gas temperature and sets the flag F4. Thereafter, the controller 60 returns to step S12. On the other hand, when the flag F4 has been set, it can be considered that clogging of the reducing agent injection valve 34 is not due to temporary crystallization of the reducing agent, so the controller 60 advances to step S25.

In a state where the controller 60 has advanced to step S25, the potential that clogging is occurring in the reducing agent injection valve 34 is high, so the controller 60 advances a counter value $N_B$ of an error counter by 1. Next, in step S26, the controller 60 discriminates whether or not the counter value $N_B$ is equal to or greater than a threshold value $N_B0$ for finally determining that clogging is occurring. If the counter value $N_B$ is less than the threshold value $N_B0$, the controller 60 returns to step S12. On the other hand, if the counter value $N_B$ is equal or greater than the threshold value $N_B0$, the controller 60 advances to step S27 where it outputs a determination result signal in response to the clogging state indicated by the currently set flag of the flags F1 to F3 indicating the clogging states. Then, the controller 60 ends the present routine.

Although it is not shown, when the reducing agent injection valve 34 is in the lightly clogged state or the heavily clogged state, for example, the controller 60 can perform control that suppresses shifts in the reducing agent injection quantity by extending the amount of time in which the reducing agent injection valve 34 is open or increasing the injection pressure of the reducing agent injection valve 34. Further, when the reducing agent injection valve 34 is in the heavily clogged state or the completely clogged state, for example, the controller 60 can impose a restriction on the output of the internal combustion engine 5 while actuating a warning lamp for prompting replacement of the reducing agent injection valve 34.

Second Embodiment

A reducing agent injection valve abnormality detection device and abnormality detection method pertaining to a second embodiment are configured to perform determination of whether or not some kind of clogging is occurring in the reducing agent injection valve before determining the extent of clogging of the reducing agent injection valve that has been described in the first embodiment.

That is, the second embodiment is a reducing agent injection valve abnormality detection method for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, clogging of the reducing agent injection valve, the reducing agent injection valve abnormality detection method including:

fixing the output of the pump and opening the reducing agent injection valve for a predetermined amount of time in a state where the pressure inside the supply path has become a value in a predetermined range;

obtaining the pressure, or a pressure drop quantity, inside the supply path when the reducing agent injection valve has been opened for the predetermined amount of time; and determining the extent of clogging of the reducing agent injection valve by comparing, with plural threshold values, the pressure, or the pressure drop quantity, inside the supply path that has been detected.

The reducing agent injection valve abnormality detection device and abnormality detection method of the present embodiment will be described below focusing on what differs from the first embodiment. The reducing agent injection device 30 of the present embodiment has the same configuration as that of the reducing agent injection device 30 of the first embodiment.

1. Controller (Abnormality Detection Device)

Figure 6:
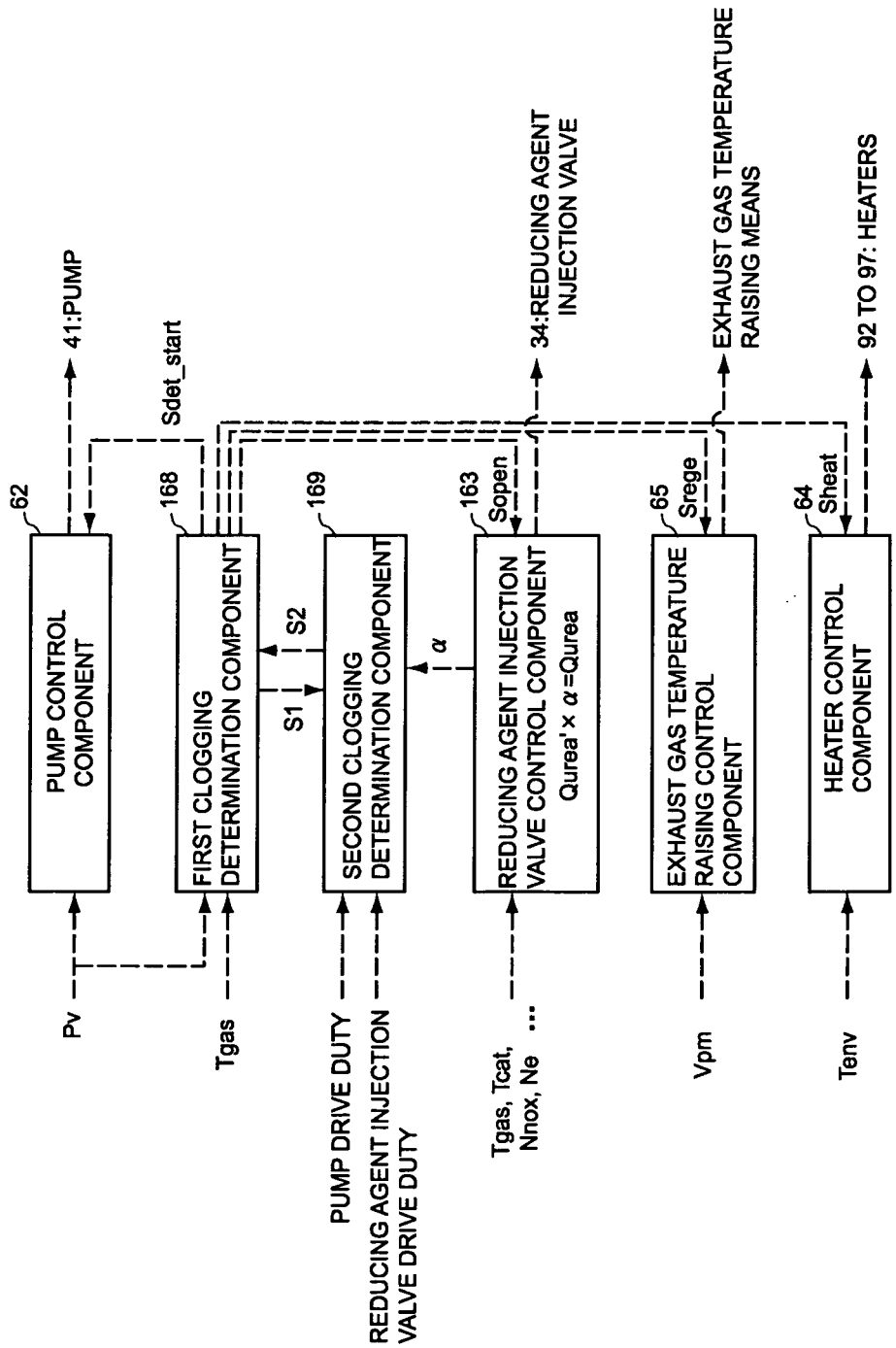
FIG. 6 is a block diagram showing an example configuration of a reducing agent injection valve abnormality detection device pertaining to the second embodiment of the present invention.

FIG. 6 shows an example configuration where portions of a controller 160 of the present embodiment that are associated with detecting abnormality of the reducing agent injection valve 34 are represented by functional blocks. This controller 160 has as its main elements and is configured by a pump control component 62, a reducing agent injection valve control component 163, a heater control component 64, an exhaust gas temperature raising control component 65, a first clogging determination component 168, a second clogging determination component 169, and the like.

Of these, the pump control component 62, the heater control component 64, and the exhaust gas temperature raising control component 65 are configured in the same manner as those described in the first embodiment.

(1) Reducing Agent Injection Valve Control Component

The basic configuration of the reducing agent injection valve control component 163 is the same as that of the reducing agent injection valve control component 63 in the controller 60 of the first embodiment, but it will be described in greater detail here.

In order to make a ratio Rnox of a $NO_x$ concentration Nd on the downstream side of the reduction catalyst 20 detected by the $NO_x$ sensor 14 with respect to a $NO_x$ concentration Nu on the upstream side of the reduction catalyst 20 estimated from the operating state of the internal combustion engine 5 zero, the reducing agent injection valve control component 163 obtains a feedback coefficient α corresponding to the value of the ratio Rnox. The target injection quantity Qurea is calculated by multiplying this feedback coefficient α by a target injection quantity Qurea' of the reducing agent calculated on the basis of the exhaust gas temperature Tgas, the reduction catalyst temperature Tcat and the like. The feedback coefficient α can also be updated per predetermined amount of time or constantly updated.

(2) First Clogging Determination Component

The first clogging determination component 168 executes first-order determination control and third-order determination control. Of these, the third-order determination control is the same as what is executed by the clogging determination component 66 in the controller 60 of the first embodiment, so detailed description thereof will be omitted here. This third-order determination control is executed when a second-order determination end signal S2 has been transmitted from the second clogging determination component 169.

Further, the first-order determination control is basically performed in the same manner as the third-order determination control. However, a first-order threshold value Pdet_thr0 that the first clogging determination component 168 compares with the pressure Pdet inside the second supply path 58 that has been read after the valve opening operation of the reducing agent injection valve 34 has been performed is set to a somewhat higher value than the threshold value Pdet_thr1 used in the third-order determination control. In the first-order determination control, the first clogging determination component 168 detects that the completely clogged state is reliably occurring in the reducing agent injection valve 34 by comparing the detected pressure Pdet with this first-order threshold value Pdet_thr0. This first-order determination control is mainly executed at the time when the internal combustion engine 5 is started, that is, at the time when the reducing agent injection valve 30 is operating. The purpose of the first-order determination control is to detect only when complete clogging is reliably occurring because, at the time of execution, there is the potential that air is mixed inside the second supply path 58.

When it has been detected that the completely clogged state is reliably occurring, the first clogging determination component 168 speedily stops reducing agent injection control and, for example, switches the internal combustion engine 5 to a limp-home mode. Further, when the completely clogged state has not been detected, the first clogging determination component 168 transmits a first-order determination end signal S1 to the second clogging determination component 169.

(3) Second Clogging Determination Component

The first-order determination control and the third-order determination control executed by the first clogging determination component 168 use a change in the pressure inside the second supply path 58 when the valve opening operation of the reducing agent injection valve 34 has been performed in a state where the output of the pump 41 has been fixed. In contrast, the second clogging determination component 169 is configured to execute determination of clogging of the reducing agent injection valve 34 by looking at whether the output of the pump 41 is fluctuating in response to the injection quantity from the reducing agent injection valve 34 in a state where ordinary injection control of the reducing agent is executed and the output of the pump 41 is feedback-controlled on the basis of the pressure inside the second supply path 58.

Specifically, the second clogging determination component 169 continuously reads the drive duty of the reducing agent injection valve 34 and the output (drive duty) of the pump 41 and obtains a change ΔDpump in the drive duty of the pump 41 when a change equal to or greater than a predetermined change has occurred in the drive duty of the reducing agent injection valve 34. When this change ΔDpump in the drive duty of the pump 41 is less than a predetermined threshold value ΔD1, the second clogging determination component 169 determines that there is the potential that the reducing agent injection valve 34 is in the completely clogged state and transmits the second-order determination end signal S2 to the first clogging determination component 168 such that the first clogging determination component 168 executes the third-order determination control.

Further, when the change ΔDpump in the drive duty of the pump 41 is equal to or greater than the threshold value ΔD1, the second clogging determination component 169 compares the change ΔDpump in the drive duty with a threshold value ΔD2 that is larger than the threshold value ΔD1. When the change ΔDpump in the drive duty is less than the threshold value ΔD2, the second clogging determination component 169 reads the feedback coefficient α at that time which is set by the reducing agent injection valve control component 163, grasps the extent of error occurring in the injection quantity, and transmits the second-order determination end signal S2 to the first clogging determination component 168 such that the first clogging determination component 168 executes the third-order determination control.

In this manner, because of this second-order determination control, control is moved to the third-order determination control only when it has been determined that some kind of clogging is occurring in the reducing agent injection valve 34. Consequently, until that kind of potential for clogging appears, the controller 160 can monitor whether or not there is clogging of the reducing agent injection valve 34 without interrupting the ordinary fuel injection control mode.

The controller 160 can also use information of the injection quantity instead of the drive duty of the reducing agent injection valve 34. Further, the controller 160 can also use information of the pressure inside the second supply path 58 or information of the discharge quantity of the pump 41 instead of the drive duty of the pump 41.

2. Reducing Agent Injection Valve Abnormality Detection Method

Figure 7:
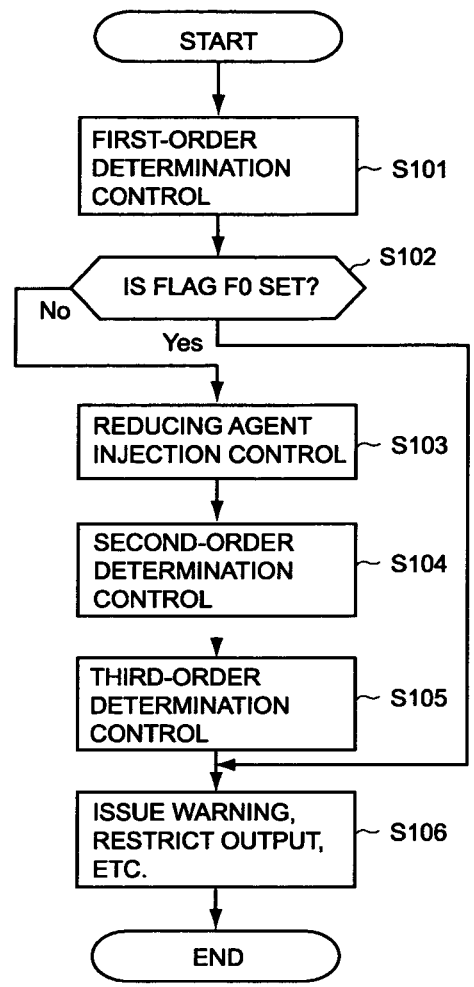
FIG. 7 is a flowchart for describing a reducing agent injection valve abnormality detection method pertaining to the second embodiment of the present invention.
Figure 8:
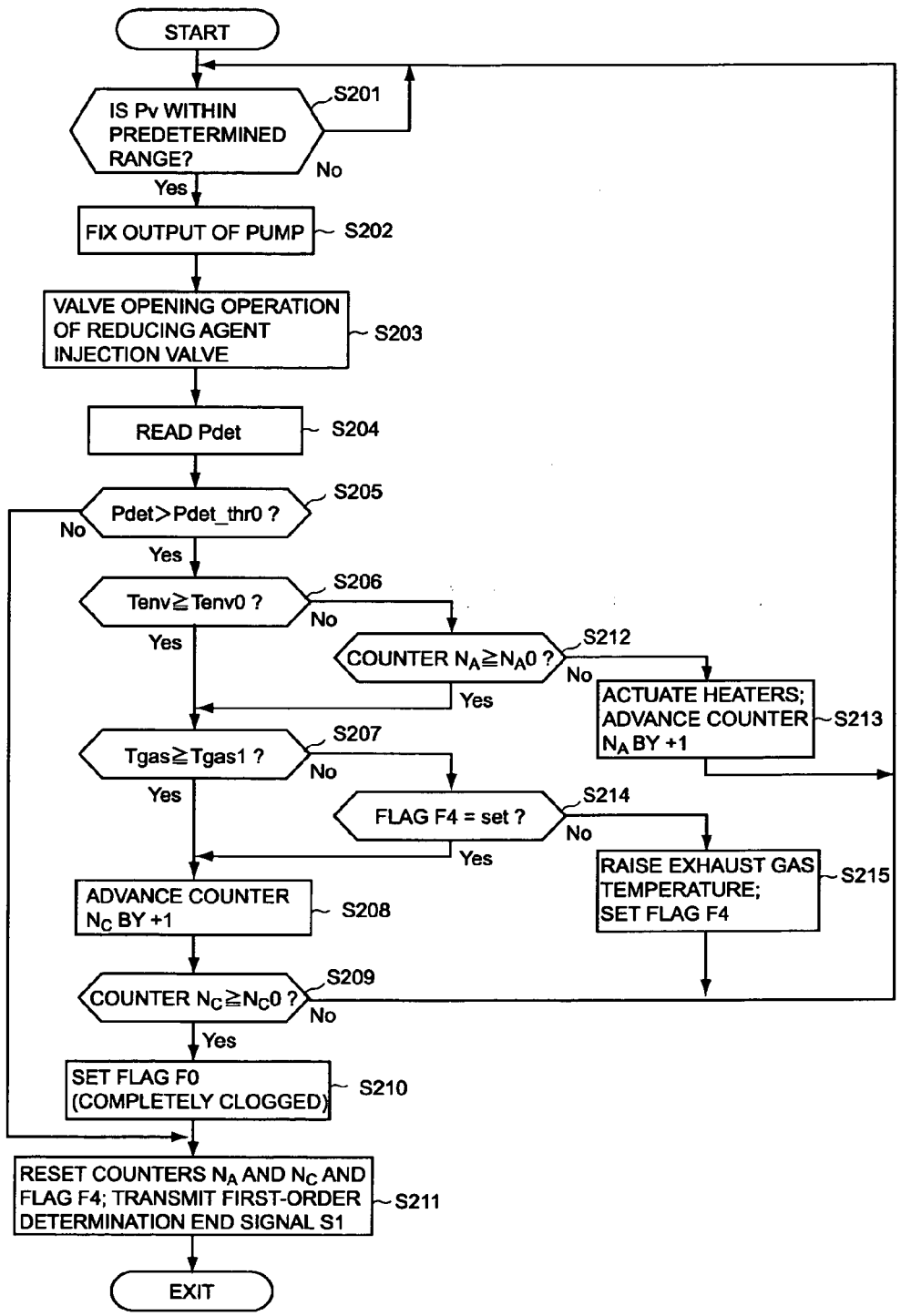
FIG. 8 is a flowchart for describing first-order determination control pertaining to the second embodiment of the present invention.
Figure 9:
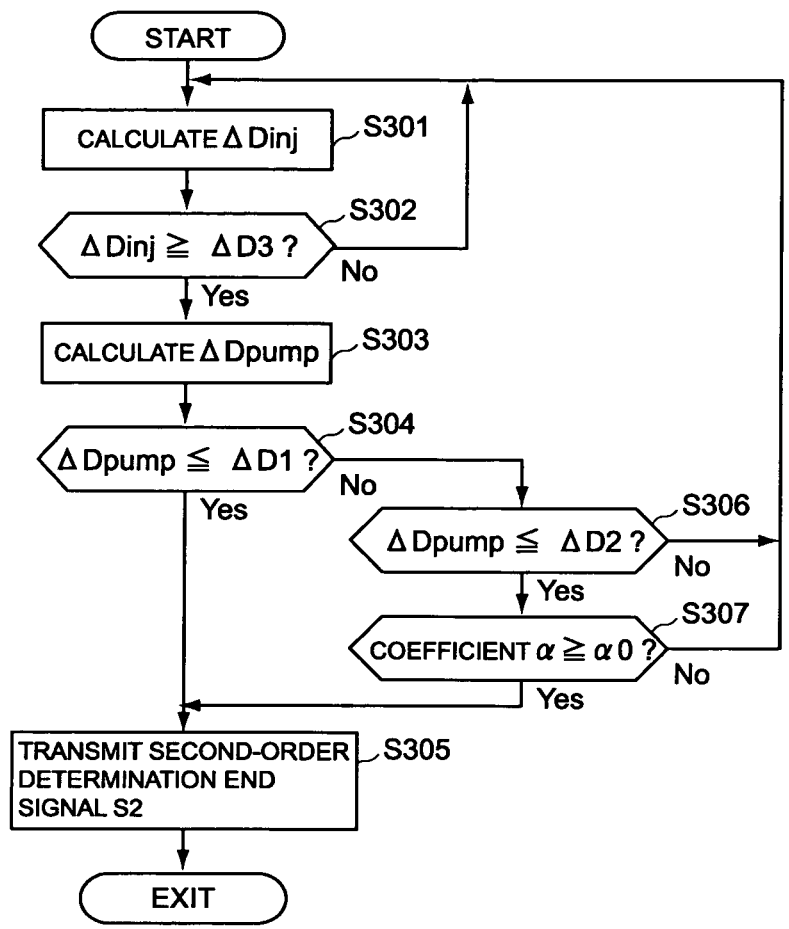
FIG. 9 is a flowchart for describing second-order determination control pertaining to the second embodiment of the present invention.

Next, a method of determining the extent of clogging of the reducing agent injection valve 34 that is executed by the controller (abnormality detection device) 160 of the present embodiment will be specifically described on the basis of the control flows shown in FIG. 7 to FIG. 9.

FIG. 7 shows an overall flow of the clogging determination of the present embodiment.

In this clogging determination, first, the first-order determination control is executed in step S101. FIG. 8 shows a flow of the first-order determination control. In this first-order determination control, first, of the flow of the third-order determination control (which corresponds to the determination control described in the first embodiment) shown in FIG. 4 and FIG. 5, the controller 160 executes step S201 to step S204 along the sequence of step S12 to step S15 of FIG. 4 and reads the pressure Pdet inside the second supply path 58. Next, in step S205, using the first-order threshold value Pdet_thr0 that is larger than the threshold value Pdet_thr1 used in the third-order determination control, it is discriminated whether or not the pressure Pdet exceeds the first-order threshold value Pdet_thr0.

When the pressure Pdet is equal to or less than the first-order threshold value Pdet_thr0, it is judged that the reducing agent injection valve 34 is not in the completely clogged state, and the controller 160 advances to step S211. On the other hand, when the pressure Pdet exceeds the first-order threshold value Pdet_thr0, there is the potential that the reducing agent injection valve 34 is in the completely clogged state. In this case, the controller 160 advances to step S206 and executes step S206 to step S209 along the sequence of step S23 to step S31 of FIG. 5 of the flow of the third-order determination control. As a result, when a completely clogged state of which freezing or temporary crystallization of the reducing agent is not the cause has been detected, the controller 160 advances to step 210 where it sets a flag F0 indicating that the completely clogged state is reliably occurring. Thereafter, the controller 160 advances to step S211.

In step S211, to which the controller 160 advances after discrimination of whether or not the completely clogged state is reliably occurring has ended, the controller 160 resets the counter $N_A$, the counter $N_B$, and the flag F4, transmits the first-order determination end signal S1, and ends the first-order determination control.

Returning now to FIG. 7, when the first-order determination control ends in step S101, then in the next step S102, it is discriminated as a result of the first-order determination control whether or not the flag F0 indicating the completely clogged state of the reducing agent injection valve 34 is set. When the flag F0 is set, the controller 160 advances to step S106. On the other hand, when the flag F0 is not set, the controller 160 advances to step S103 where it starts ordinary injection control of the reducing agent resulting from the reducing agent injection device 30. Thereafter, the controller 160 advances to step S104 in order to execute the second-order determination control.

FIG. 9 shows the flow of the second-order determination control. In this example of the second-order determination control, first, in step S301, the controller 160 continuously reads the drive duty of the reducing agent injection valve 34 and calculates a change ΔDinj in the drive duty. Next, in step S302, it is discriminated whether or not the change ΔDinj in the drive duty of the reducing agent injection valve 34 is equal to or greater than a predetermined value ΔD3. When the change ΔDinj in the drive duty is less than the predetermined value ΔD3, the controller 160 returns to step S301. Step S301 and step S302 are repeated until it is determined that the change ΔDinj in the drive duty is equal to or greater than the predetermined value ΔD3.

When the change ΔDinj in the drive duty has become equal to or greater than the predetermined value ΔD3, the controller 160 advances to step S303 where it calculates the change ΔDpump in the drive duty of the pump 41 at that time. Thereafter, in step S304, it is discriminated whether or not the change ΔDpump in the drive duty of the pump 41 is equal to or less than the predetermined threshold value ΔD1. When the change ΔDpump in the drive duty of the pump 41 is equal to or less than the threshold value ΔD1, there is the potential that the reducing agent injection valve 34 is in the completely clogged state, so the controller 160 advances to step S305 in order to execute the third-order determination control, transmits the second-order determination end signal S2, and ends the second-order determination control.

On the other hand, when the change ΔDpump in the drive duty of the pump 41 exceeds the threshold value ΔD1, the controller 160 advances to step S306, and it is discriminated whether or not the change ΔDpump in the drive duty of the pump 41 is equal to or less than the threshold value ΔD2 that is larger than the threshold value ΔD1. When the change ΔDpump in the drive duty of the pump 41 exceeds the threshold value ΔD2, there is no potential of clogging in the reducing agent injection valve 34, so the controller 160 returns to step S301. On the other hand, when the change ΔDpump in the drive duty of the pump 41 is equal to or less than the threshold value ΔD2, the controller 160 advances to step S307 where it reads the current feedback coefficient α set in the reducing agent injection valve control component 163, and it is discriminated whether or not the feedback coefficient α is equal to or greater than a predetermined threshold value α0.

When the feedback coefficient α is less than the threshold value α0, there is the potential that partial clogging is occurring in the reducing agent injection valve 34, but because this does not greatly affect the injection quantity of the reducing agent, the controller 160 returns to step S301 without moving to the third-order determination control. On the other hand, when the feedback coefficient α is equal to or greater than the threshold value α0, there is the potential that partial clogging of the reducing agent injection valve 34 is occurring to the extent that it will greatly affect the injection quantity of the reducing agent, so the controller 160 advances to step S305 in order to execute the third-order determination control, transmits the second-order determination end signal S2, and ends the second-order determination control.

Returning now to FIG. 7, when the signal S2 to move to the third-order determination control has been transmitted as a result of the second-order determination control executed in step S104, the controller 160 advances to step S105, and the third-order determination control is executed. The third-order determination control is executed along the control flow of FIG. 4 and FIG. 5.

In the present embodiment, control is moved to the third-order determination control on the premise that some kind of clogging is occurring in the reducing agent injection valve 34 in the second-order determination control, and at the time when step S105 ends, the extent of clogging of the reducing agent injection valve 34 is identified.

Additionally, in step S106, to which the controller 160 advances after the completely clogged state is detected in the first-order determination control or after the extent of clogging has been identified in the third-order determination control, the controller 160 actuates a warning lamp for prompting replacement of the reducing agent injection valve 34 or imposes a restriction on the output of the internal combustion engine 5, for example, in response to the extent of clogging. Thereafter, the controller 160 ends the present routine.

According to the reducing agent injection valve abnormality detection method of the present embodiment, it is discriminated whether or not the completely clogged state of the reducing agent injection valve 34 is reliably occurring at the time when the reducing agent injection device 30 is operating, and when the completely clogged state has not been seen, ordinary injection control of the reducing agent is executed. Further, unless there is seen the potential that some kind of clogging is occurring in the reducing agent injection valve 34 while the reducing agent injection control is executed, the reducing agent injection control is not interrupted. Consequently, detection of abnormality of the reducing agent injection valve 34 can be executed without affecting exhaust gas purification control.

What is claimed is:
1. A reducing agent injection valve abnormality detection device for detecting,
in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path,
clogging of the reducing agent injection valve,
the reducing agent injection valve abnormality detection device comprising:

a pressure detection component that detects the pressure inside the supply path on the basis of a sensor value of the pressure sensor;

a pump control component that fixes the output of the pump in a state where the pressure inside the supply path has become a value in a predetermined range;

a reducing agent injection valve control component that opens the reducing agent injection valve for a predetermined amount of time in a state where the output of the pump has been fixed; and a clogging determination component that determines the extent of clogging of the reducing agent injection valve by comparing, with plural threshold values, the pressure, or a pressure drop quantity, inside the supply path when the reducing agent injection valve has been opened for the predetermined amount of time, wherein the reducing agent injection valve is a multiple injection hole-type injection valve having plural injection holes, and the number of the plural threshold values is the same as the number of the injection holes.

2. The reducing agent injection valve abnormality detection device according to claim 1, wherein the clogging determination component uses a first-order threshold value for determining that the reducing agent injection valve is completely clogged to determine whether clogging is occurring in the reducing agent injection valve and, when it has been determined that the reducing agent injection valve is not completely clogged, uses the plural threshold values to determine the extent of the clogging.

3. The reducing agent injection valve abnormality detection device according to claim 1, wherein the pump control component performs feedback control of the output of the pump, such that the pressure inside the supply path is maintained at a predetermined target pressure, during execution of reducing agent injection control, and when a change in the output of the pump corresponding to an injection quantity from the reducing agent injection valve is not seen during execution of the reducing agent injection control, the clogging determination component executes determination of the extent of the clogging.

4. The reducing agent injection valve abnormality detection device according to claim 1, wherein the reducing agent is an aqueous solution of urea, when the outdoor air temperature or the temperature of exhaust gas is less than a predetermined temperature when clogging of the reducing agent injection valve has been detected, the clogging determination component actuates heating means or exhaust gas temperature raising means disposed in the reducing agent injection device and thereafter again determines the extent of the clogging.

5. A reducing agent injection valve abnormality detection method for detecting, in a reducing agent injection device equipped with a storage tank that houses a reducing agent, a pump that pressure-feeds the reducing agent, a reducing agent injection valve that injects the reducing agent pressure-fed by the pump into the inside of an exhaust pipe of an internal combustion engine, a supply path that interconnects the pump and the reducing agent injection valve, and a pressure sensor that is disposed in the supply path, clogging of the reducing agent injection valve, the reducing agent injection valve abnormality detection method comprising:

fixing the output of the pump and opening the reducing agent injection valve for a predetermined amount of time in a state where the pressure inside the supply path has become a value in a predetermined range;

obtaining the pressure, or a pressure drop quantity, inside the supply path when the reducing agent injection valve has been opened for the predetermined amount of time; and determining the extent of clogging of the reducing agent injection valve by comparing, with plural threshold values, the pressure, or the pressure drop quantity, inside the supply path that has been detected, wherein the reducing agent injection valve is a multiple injection hole-type injection valve having plural injection holes, and the number of the plural threshold values is the same as the number of the injection holes.

* * * * *